March 10, 1970    H. E. FREDERICK ET AL    3,499,184
NECK DEHYDRATING APPARATUS FOR POULTRY Filed Feb. 1, 1968     3 Sheets-Sheet 1

INVENTORS.
Henry E. Frederick
Jack L. Hathorn
BY
John A. Hamilton
Attorney.

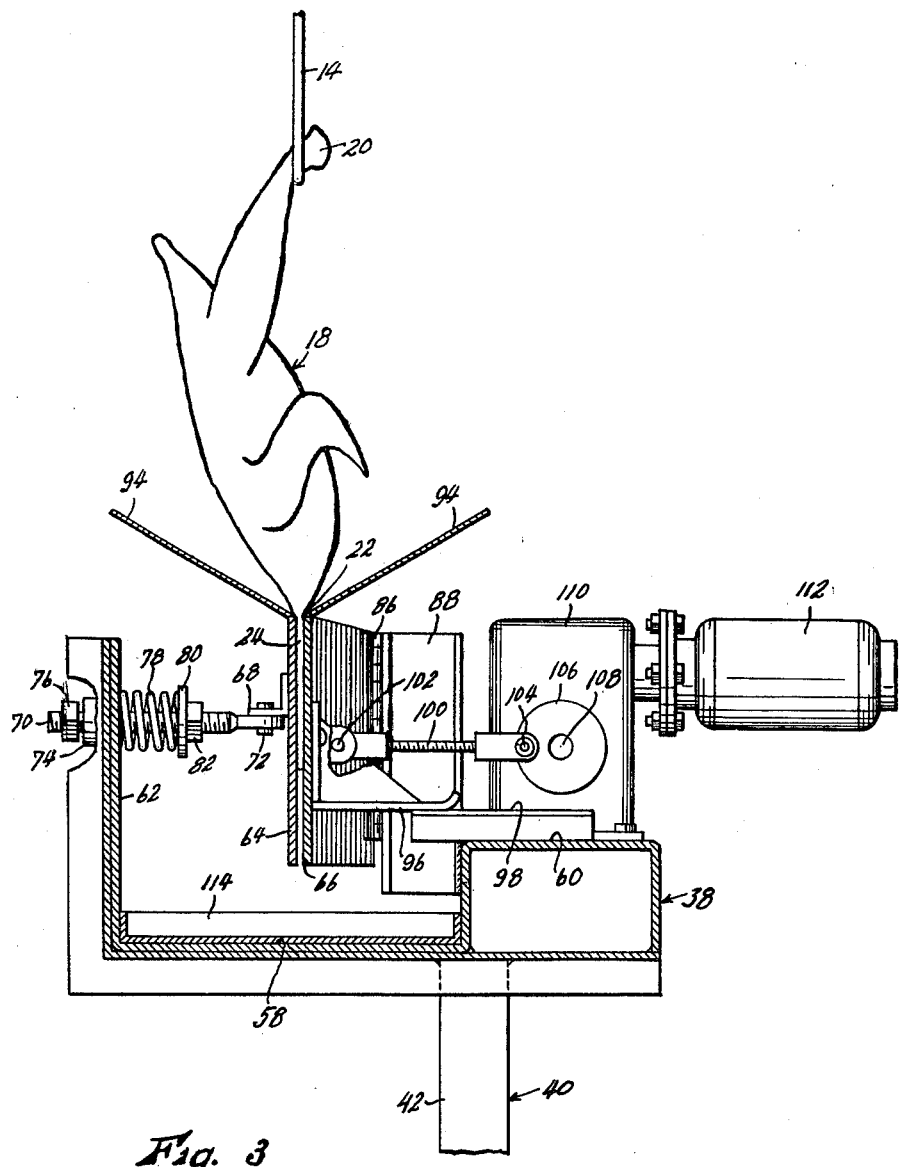

United States Patent Office 3,499,184
Patented Mar. 10, 1970

3,499,184
NECK DEHYDRATING APPARATUS
FOR POULTRY
Henry E. Frederick, Kansas City, and Jack L. Hathorn, Independence, Mo., assignors, by mesne assignments, to Gordon Johnson Company, Kansas City, Mo., a corporation of Missouri
Filed Feb. 1, 1968, Ser. No. 702,359
Int. Cl. A22c 21/00; A22b 5/00
U.S. Cl. 17—11                                      9 Claims

ABSTRACT OF THE DISCLOSURE

An apparatus for removing water from the neck skin, flesh and other tissue depending from the neck openings of poultry as said poultry is moved along a conveyor line suspended in a neck-down position in an automated poultry processing plant, said apparatus consisting of a frame supported adjacent said poultry and a pair of pressure plates carried by said frame so as to be disposed at relatively opposite sides of hte neck portions of said poultry as they move along said conveyor, and means for oscillating said pressure plates rapidly toward and from each other whereby the neck tissues of the birds are repeatedly squeezed therebetween to remove water therefrom.

---

Figure 1:
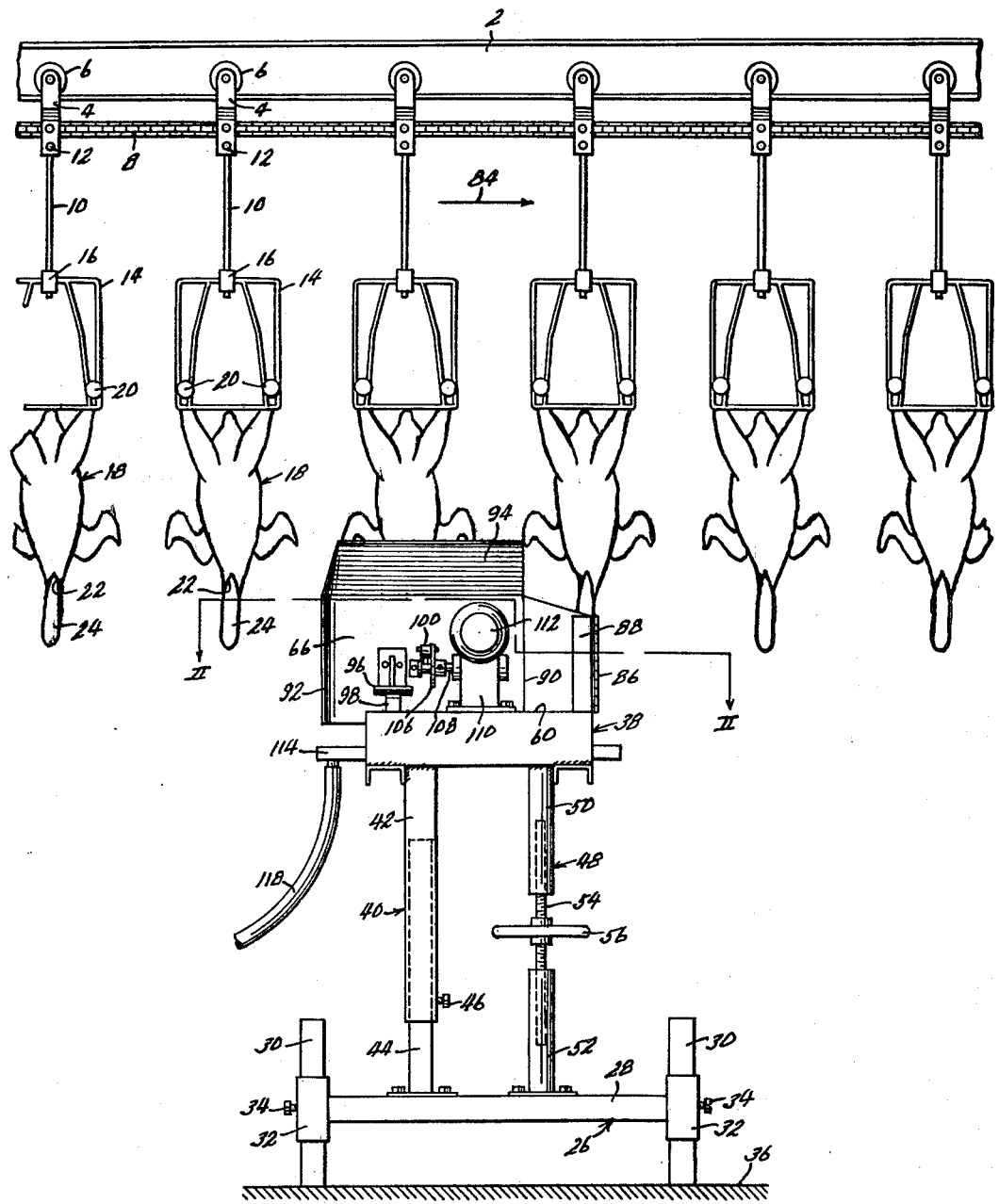

This invention relates to new and useful improvements in poultry processing equipment, and has particular reference to apparatus for dehydrating the neck skin and other tissues of the birds during processing thereof.

In automated poultry processing plants, the birds are normally moved from one processing step to the next on overhead conveyor lines, and at certain times it becomes desirable to remove excess water therefrom, by draining or otherwise, particularly just prior to packaging and freezing, at which time both efficiency of operation and Department of Agriculture regulations limit the maximum allowable moisture content of the carcasses. After killing, defeathering and evisceration, the carcasses are normally cooled by immersion for substantial periods in ice water contained in chilling tanks, and then moved by a conveyor to packaging and freezing areas, or in some instances to further processing steps. The carcasses absorb and retain considerable moisture in the chilling tanks, most of which must be removed prior to packaging or further processing. Most of this removal occurs by drainage on the conveyor line moving away from the chilling tanks, this drainage being reasonably complete even from the interior of the carcass since the neck bone has ordinarily been removed at this time, thus forming a neck opening through which water from the interior of the carcass may drain as the bird is suspended from the conveyor in a neck-down position. However, the neck skin, together with other internal facia and tissue, still depend from the neck opening of the carcass, and usually is of such nature that it traps and retains substantial amounts of water which is not effectively removed by drainage. This trapped water is undesirable in packaging, often creating a white, icy appearance in the package when frozen, which reduces sales appeal, and in some cases may elevate the overall moisture content of the entire carcass above allowable limits. As a result, present practice requires the presence of human operators stationed in the conveyor line whose function it is to manually squeeze or wring excess water from the neck tissues of the carcasses as they pass. This is difficult, tedious work, since chicken processing lines handling 10,000 chickens per hour, and turkey processing lines handling perhaps half as many turkeys, are not at all unusual. Moreover, it represents a substantial labor cost.

Accordingly, the principal object of the present invention is the provision of an apparatus for performing mechanically the formerly manual operation of removing excess water from the neck tissues of poultry on a conveyor line.

Another object is the provision of an apparatus of the character described often called a "neck dehydrator," consisting of a pair of pressure plates disposed respectively at opposite sides of the path of travel of the neck portions of the birds on the conveyor, one of said plates being oscillatable toward and against the other of said plates whereby to squeeze the neck tissues of the birds therebetween to remove moisture therefrom, said other plate being yieldably mounted whereby to prevent damage to the neck tissues. The frequency of oscillation is sufficiently high to prevent the momentary immobilization of the neck of each bird from interfering with forward movement of the bird by the conveyor.

Another object is the provision of an apparatus of the character described having means for adjusting the pressure plates to accommodate birds which are of different sizes, and hence depend to different distances below the conveyor line.

Another object is the provision of an apparatus of the character described having means for collecting and disposing of the moisture removed from the poultry.

Other objects are simplicity and economy of construction, efficiency and dependability, and adaptability for use in a wide variety of applications.

Figure 2:
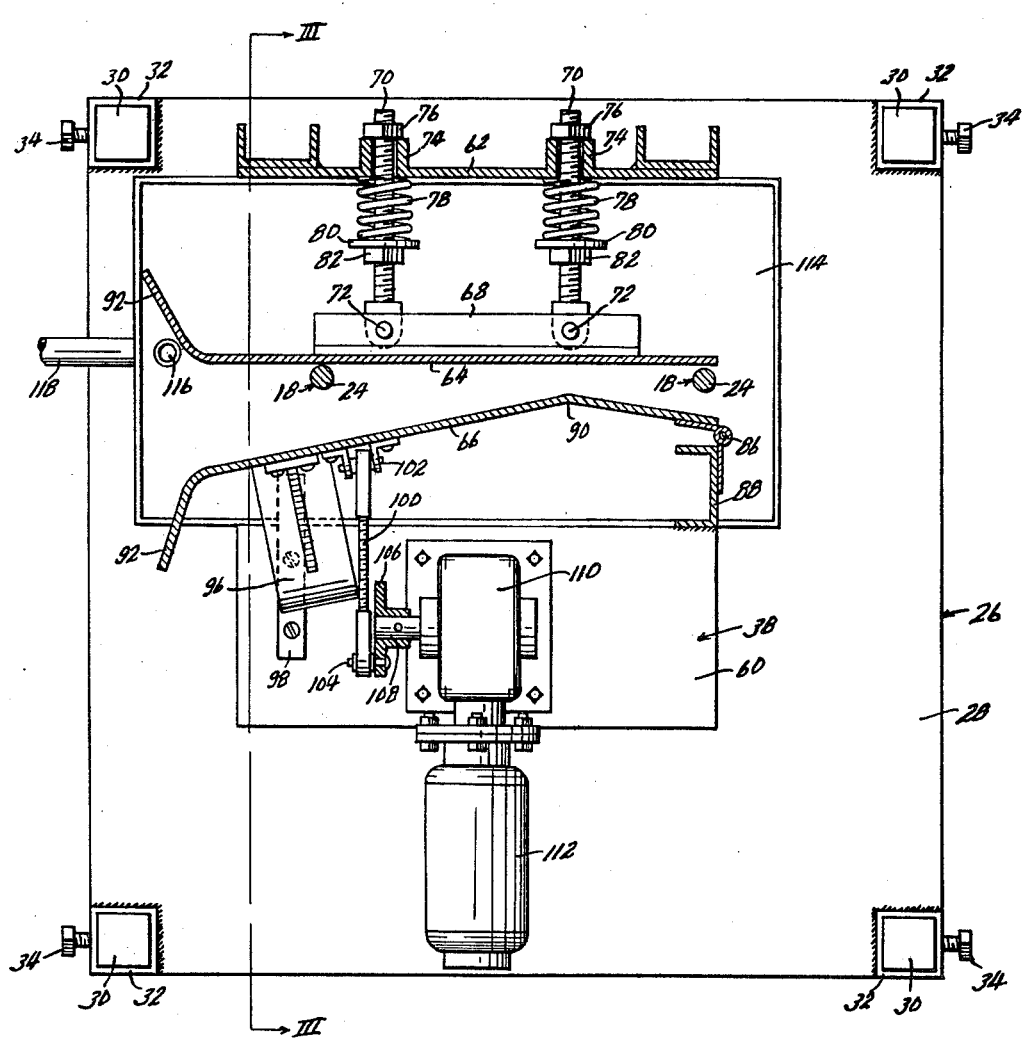

With these objects in view, as well as other objects which will appear in the course of the specification, reference will be had to the accompanying drawings wherein:

FIG. 1 is a side elevational view of a neck dehydrating apparatus for poultry as contemplated by the present invention, shown in operative relationship to poultry suspended from a conveyor line, FIG. 2 is an enlarged sectional view taken on line II—II of FIG. 1, with parts left in elevation and with the pressure plates open, and FIG. 3 is a fragmentary sectional view taken on line III—III of FIG. 2, with the pressure plates closed.

Like reference numerals apply to similar parts throughout the several views, and the numeral 2 applies to the fixed rail of a poultry conveyor system. The details of the system are not pertinent to the present invention, and could take several forms, but as shown rail 2 constitutes an I-beam rigidly supported by any suitable means, not shown, and carries a continuous series of brackets 4 each supported for movement therealong by rollers 6. Said brackets are connected together in regularly spaced relation by a flexible conveyor chain 8 extending beneath rail 2. It will be understood that chain 8 is driven by any suitable means, not shown, whereby the brackets are moved along the rail. A shank member 10 is pivoted at its upper end, as at 12, to each of brackets 4. A poultry shackle 14 is swivelled to the lower end of each shank 10 for rotation about the axis of the latter, the swivel connection being indicated at 16. Each shackle 14 may also have different forms without affecting the scope of the present invention. As shown, the shackles are of a type commonly used to convey poultry from the chilling tanks, in which they are immersed in ice water for a substantial time period to remove body heat after they have been killed, scalded, defeathered and eviscerated, to packaging and freezing areas. The feet have been removed at this time, so that each carcass 18 is suspended from its associated shackle by its hock joints 20, in a neck-down position. The neck bones of the carcasses have also ordinarily been removed at this time, leaving a neck opening 22 through which moisture may drain from the interior of the carcass, but neck skin and flesh, together with other body tissues, still hang downwardly from the neck opening, and will conjointly be called neck tissues and indicated at 24. These neck tissues often include sac-like formations which trap and retain considerable amounts of moisture. This water may escape when the carcass is later packaged in transparent material preparatory to freezing, and create a layer of ice between the carcass and the packaging material. This reduces its sales appeal. Also, there are strict governmental regulations concerning the maximum allowable moisture content of poultry offered for public sale, and moisture trapped in the neck tissues as described above may well cause rejection or downgrading of carcasses for reasons of excess moisture.

The apparatus contemplated by the present invention for removing said moisture includes a frame designated generally by the numeral 26 and including a square, horizontal base 28 supported at each corner by a floor-engaging leg 30, said leg being vertically slidable in a sleeve 32 affixed to the base, and adjustably fixed in said sleeve by set screw 34, whereby the elevation of the base relative to the floor 36 may be adjusted. Said base is adapted to be positioned directly beneath the path of travel of poultry carcasses 18. Disposed directly above base 28, but still below carcasses 18, is a generally horizontal platform 38. Said platform is supported by a vertical leg 40 having an upper section 42 welded to the platform and telescoped slidably over a lower section 44 affixed to base 28, said upper section being adjustably fixable on said lower section by set screw 46. Platform 38 is also supported by a leg 48 having an upper section 50 welded to the platform and axially aligned with a lower section 52 affixed to the base, a screw 54 having respectively left and right hand threads engaged respectively in said lower and upper sections, and a handwheel 56 affixed to said screw. By loosening set screw 46 and turning handwheel 56, the elevation of platform 38 relative to base 28 may be adjusted.

Platform 28, in use, is disposed somewhat below the neck tissues 24 of carcasses 18. It has a central portion 58 (see FIG. 3) directly beneath the path of travel of said neck tissues, an elevated shelf 60 extending longitudinally thereof at one side of said path of travel, and an upstanding side wall 62 rising vertically therefrom at the longitudinal edge thereof opposite from shelf 60. A pair of vertical pressure plates 64 and 66, the planes of which extend generally parallel to and respectively at opposite sides of the path of travel of neck tissues 24, are disposed above the central portion 58 of platform 38. Plate 64 has a horizontal bar 68 affixed to the outer surface thereof, and said plate is supported by a pair of spaced apart bolt shanks 70 each pivoted at its inner end to bar 68 on a vertical axis, as at 72, and extending horizontally and transversely outwardly therefrom, each projecting slidably through a boss 74 provided therefor in side wall 62 of platform 38, having a locknut 76 threaded thereon to abut the outer end of said boss. Inwardly of side wall 62, each shank 72 has a helical compression spring 78 disposed thereabout, said spring being compressed against the inner surface of side wall 62 by a washer 80 and nut 82 threaded on the shank, whereby pressure plate 64 is urged inwardly or away from side wall 62 as far as permitted by locknuts 76. The yieldable pressure holding said pressure plate inwardly may of course be adjusted by turning nuts 82 to compress springs 78 to greater or lesser degrees.

Pressure plate 66, at the ends of the plates between which neck tissues exit, considering that the conveyor moves in the direction of arrow 84 in FIG. 1, is connected by a vertical hinge 86 to an upstanding post 88 affixed to shelf portion 60 of platform 38, whereby plate 66 may be moved pivotally toward and from plate 64. The body portion of plate 66 is capable of moving into overlying planar contact with plate 64, but hinge 86 is spaced transversely apart from plate 64, plate 66 being angled as at 90 to permit this relationship. Thus when plate 66 is pivoted away from plate 64, as shown in FIG. 2, said plates are spaced apart along their entire lengths to permit the free passage of poultry carcass neck portions 24 therebetween. The ends of the pressure plates between which said neck tissues enter are flexed outwardly, as indicated at 92, to facilitate and direct the entry of said neck tissues therebetween. Also, each pressure plate has a guard plate 94 affixed along the upper edge thereof, and inclined upwardly and outwardly therefrom, as best shown in FIG. 3. These guard plates prevent the neck tissues from passing outside of the pressure plates, directing them downwardly between said pressure plates in the event they should escape. Pressure plate 66 is further supported, adjacent the flared end thereof, by a skid 96 affixed thereto and extending outwardly therefrom, said skid riding slidably on a track member 98 affixed to shaft 60 of platform 38.

Pressure plate 66 is oscillatably pivoted toward and away from plate 64 by a link 100 which is universally pivoted at one end to the outer surface of plate 66, as at 102, and extends transversely outwardly therefrom, the opposite end of said link being universally pivoted, as at 104 to a disc 106 mounted on the output shaft 108 of a gear reduction unit 110 mounted on shelf 60, pivot 104 being eccentric to shaft 108. Link 110 is adjustable in length. Gear reduction unit 110 is driven by an electric motor 112 mounted thereon.

Resting on the central portion 58 of platform 38, directly beneath pressure plates 64 and 66, is a shallow pan 114 for collecting water squeezed from poultry neck tissues 24 by said pressure plates. Said pan is provided with a drain opening 116 (see FIG. 2) which is attached to a flexible hose 118 for conveying the water so collected to any suitable disposal point, such as a floor drain.

Operation of the device is believed to be reasonably self-evident. It is set up as shown, directly beneath the conveyor line, so that the depending neck tissues 24 of the birds pass between pressure plates 64 and 66 as said birds move in the direction of arrow 84 in FIG. 1, and the pressure plates are set at an elevation such that virtually the entire neck tissues, but no other portions of the carcasses, enter therebetween. The latter adjustment, which is of course dictated by the length of the birds being processed at any given time, may be accomplished either by loosening set screws 34 and moving sleeves 32 of base 26 vertically on legs 30, or by adjusting the effective lengths of legs 40 and 48 as previously described. Motor 112 is then set in operation to oscillate pressure plate 66 pivotally toward and from pressure plate 64, whereby the neck tissues are squeezed between said pressure plates to remove water therefrom, said water being collected in pan 114 and drained away through hose 118.

The relative settings of the pressure plates, with regard to the spacing therebetween as accomplished either by turning locknuts 76 on bolt shanks 70 or by adjusting the length of drive link 100, is of some importance. Preferably, the setting is such that plate 66, at the innermost limit of its oscillation, either contacts or nearly contacts plate 64. This provides that no matter how thin the neck tissues of a given bird may be, it will receive full pressure and will force plate 64 to yield outwardly against springs 78, as shown in FIG. 3. Thus one effect of springs 78 is to tend to provide a uniform squeezing pressure on the neck tissue of each bird, regardless of how thick or thin said neck tissue may be. The degree of pressure may be adjusted as desired by turning nuts 82 to vary the tension of springs 78. It should be noted that bolt shanks 70 have sufficient horizontal looseness in bosses 74 as to permit, in conjunction with the pivotal connection of said shanks to plate 64, any slight degree of horizontal tilting of plate 64 which may occur whenever a neck tissue is not centered between said shanks. Another function of springs 78 is to prevent damage to the bird, or to the machine itself, if due to carelessness of previous evisceration operations a bird from which the neck bone has not been removed should pass along the conveyor line.

The frequency of oscillation of pressure plate 66 is also important, since the neck tissue of each bird is momentarily immobilized and held stationary at intervals by the pressure plates, while movement of the conveyor is continuous. If the neck were held stationary too long, movement of the conveyor would tend to tear the neck tissue away from the carcass. A conveyor speed of about 30 feet per minute is commonly used It has been found that with this conveyor speed, 200 oscillations per minute of plate 66 will result in the fact that the conveyor and carcass will move only a fraction of an inch during the time its neck tissue is gripped between the plates, and this travel is sufficiently small to prevent any tendency to tear the neck tissues free of the carcass Moreover, if the effective length of the pressure plates, in the direction of poultry travel, is about one foot, the above speeds provide that the neck tissue of each bird will be squeezed about six times in traversing the length of the plates. Repeated squeezing has been found to provide highly efficient moisture removal. However, the above speeds are exemplary only, and could obviously be selected as desired.

While we have shown and described a specific embodiment of our invention, it will be readily apparent that many minor changes of structure and operation could be made without departing from the spirit of the invention.

We claim:

1. An apparatus for removing moisture from the neck tissues of poultry carcasses as said carcasses are moved horizontally by a conveyor along a path of travel while suspended in a neck-down position, said apparatus comprising:
   (a) a frame supported adjacent said path of travel,
   (b) a pair of pressure plates carried by said frame respectively at opposite sides of said path of travel, whereby the neck tissues of said carcasses pass therebetween, and
   (c) operating means whereby said pressure plates are moved relatively closer together to squeeze said neck tissues therebetween.

2. An apparatus as recited in claim 1 wherein the relative movement of said pressure plates toward and from each other is oscillatory.

3. An apparatus as recited in claim 1 wherein the relative movement of said pressure plates toward and from each other is oscillatory, and is of sufficiently high frequency that the momentary immobilization of said neck tissues as they are pressed between said plates does not interfere materially with the movement of said carcasses by said conveyor.

4. An apparatus as recited in claim 1 wherein one of said pressure plates is normally stationary, and wherein said operating means is operable to move the other of said pressure plates oscillatably toward and from said normally stationary plate.

5. An apparatus as recited in claim 4 wherein said operating means is operable to move said oscillatable pressure plate substantially against said normally stationary pressure plate, and wherein said normally stationary plate is mounted in said frame by means operable to permit movement thereof away from said oscillatable plate, and with the addition of means yieldably resisting said movement of said normally stationary plate.

6. An apparatus as recited in claim 5 with the addition of means operable to adjust the resistance offered to the movement of said normally stationary plate by said yieldable resisting means.

7. An apparatus as recited in claim 5 wherein said yieldable resisting means constitutes springs, and with the addition of means operable to adjust the tension of said springs.

8. An apparatus as recited in claim 1 wherein said frame is supported by means whereby the vertical elevation of said pressure plates, relative to said poultry carcasses, may be adjusted.

9. An apparatus as recited in claim 1 with the addition of a receptacle carried by said frame immediately beneath said pressure plates whereby to receive moisture squeezed from said neck tissues by said plates, and means for conveying moisture from said receptacle to any desired location for disposal.

References Cited

UNITED STATES PATENTS 3,056,161  10/1962  Zebarth _____ 17—11
3,201,823  8/1965   Mathews _____ 17—11
3,277,514  10/1966  Hooley _____ 17—11

LUCIE H. LAUDENSLAGER, Primary Examiner

U.S. Cl. X.R.

17—45